United States Patent [19]

Pollard

[11] 4,019,230
[45] Apr. 26, 1977

[54] RECIPROCATING POWERED BICYCLE

[76] Inventor: Melville R. Pollard, 5995 S. Virginia, Reno, Nev. 89502

[22] Filed: June 30, 1975

[21] Appl. No.: 591,530

[52] U.S. Cl. .............................. 280/214; 280/255; 280/259
[51] Int. Cl.² ........................................ B62M 1/00
[58] Field of Search .......... 280/255, 256, 258, 257, 280/253

[56] References Cited

UNITED STATES PATENTS

| 1,343,616 | 6/1920 | Crear | 280/258 |
| 2,225,304 | 12/1940 | Killin, Jr. | 280/258 |
| 2,286,154 | 6/1942 | Norred | 280/258 |
| 2,653,037 | 9/1953 | Lassiter | 280/258 |

FOREIGN PATENTS OR APPLICATIONS

| 889,981 | 1/1944 | France | 280/259 |
| 358,783 | 4/1938 | Italy | 280/236 |
| 17,841 | 1900 | United Kingdom | 280/255 |
| 4,846 | 1903 | United Kingdom | 280/258 |
| 118,705 | 9/1918 | United Kingdom | 280/253 |
| 459,800 | 1/1937 | United Kingdom | 280/258 |

Primary Examiner—Joseph F. Peters, Jr.
Assistant Examiner—Jack D. Rubenstein
Attorney, Agent, or Firm—Herbert C. Schulze

[57] ABSTRACT

This is a unique arrangement for transmission of power, particularly for bicycles, and the like, in which arrangements are made through the use of roller clutch and ratchet arrangements or the like to provide for regular rotary leg motion or alternatively for reciprocating motion of pedals or power arms.

1 Claim, 7 Drawing Figures

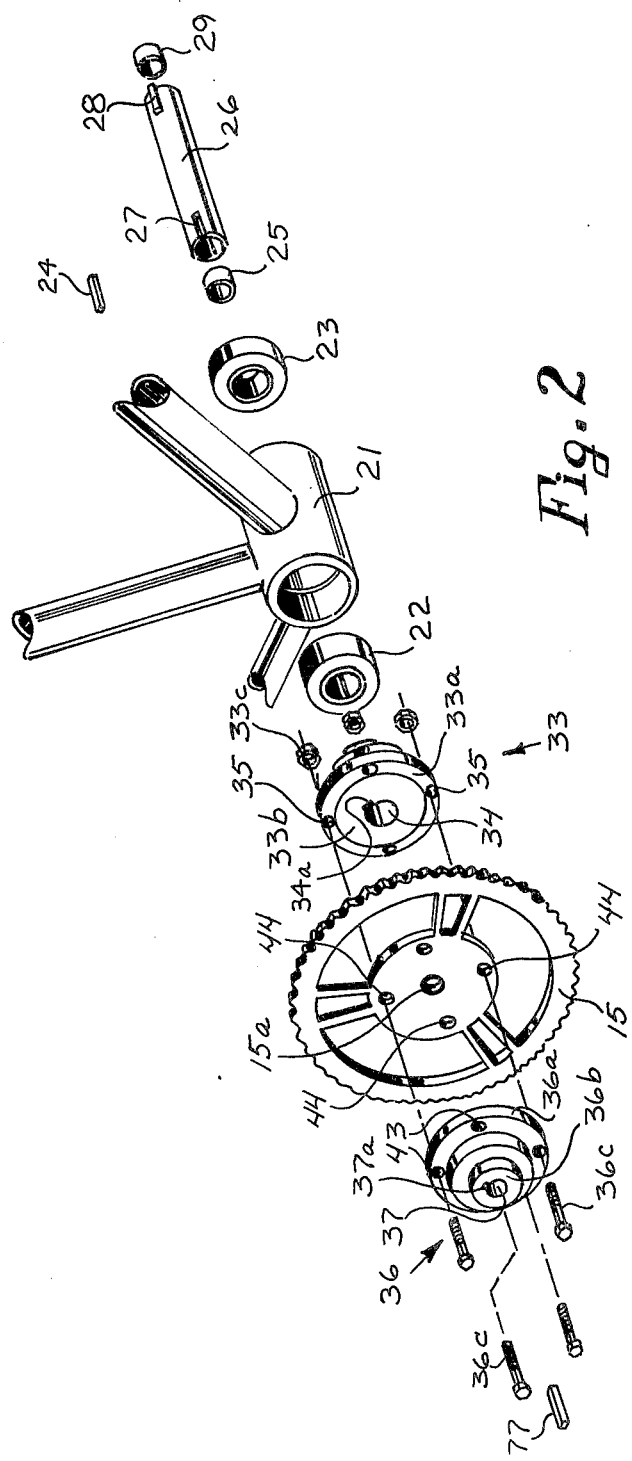

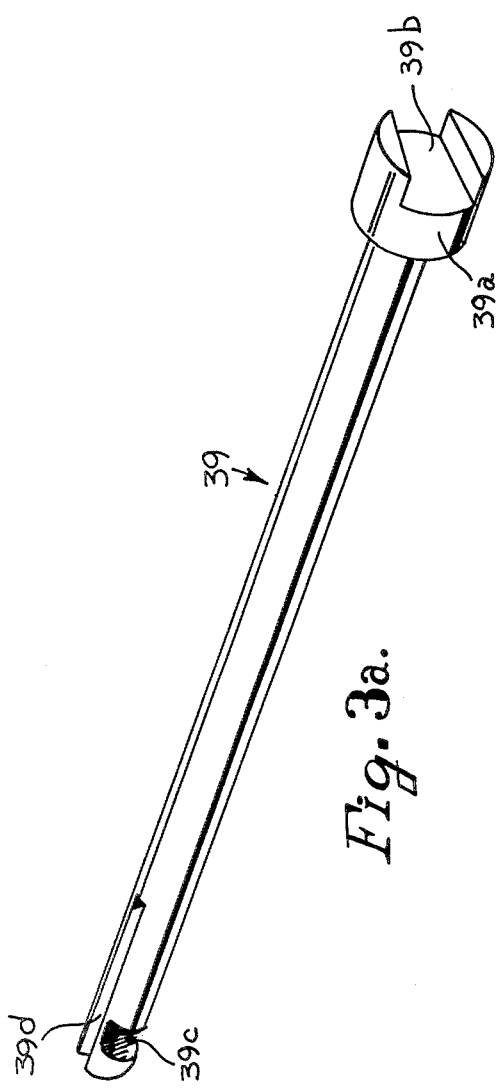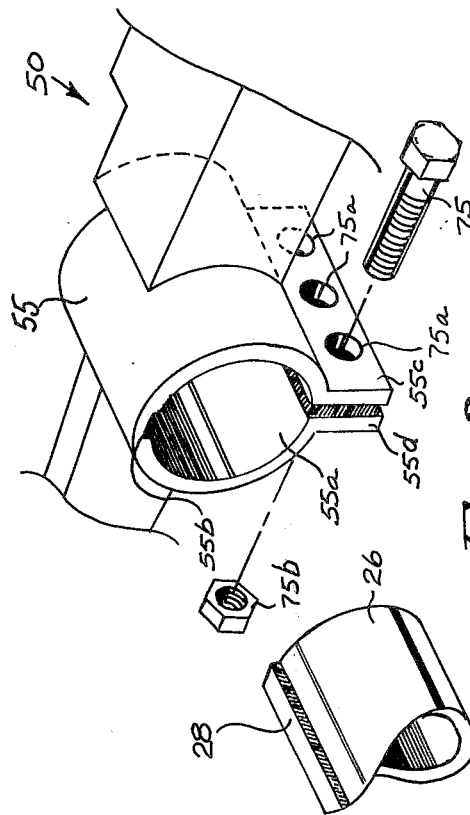

RECIPROCATING POWERED BICYCLE

CROSS REFERENCE TO RELATED PATENT APPLICATIONS

There are no related patent applications filed by me.

BACKGROUND OF THE INVENTION

1. Field of the Invention

This invention is in the general field of bicycles, and similar vehicles and is more particularly directed to a new means for transmitting the power from the users legs to the driving mechanism.

2. Description of the Prior Art

The prior art in the means of delivering power to bicyles is so crowded that to completely describe it would be futile. In general, however, there have been basically rotary-type motion transmitted through a pedal arrangement, as is well-known, and in some cases, a reciprocating type lever arrangement by which the motion is imparted. The reciprocating lever type arrangements have gone through various stages of development and one thought in connection with such arrangement is found in U.S. Pat. No. 3,661,404, which is probably the closest art to the present invention. The present invention, however, combines a reciprocating motion with the ability to convert to a rotary motion in which there is no prior art.

SUMMARY OF THE INVENTION

The bicycle is a well-known and widely used means of transportation and recreation. The bicycle has gone through many stages in its development and other vehicles have been made utilizing the principles of the bicycle. For example, there are even automobiles proposed in which transmission of power for short shopping trips and the like, would be in a manner similar to the bicycle.

In all such vehicles operated by pedals, there is wasted motion, in some cases, a tiring motion by reason of the pedal action, and less than full utilization of leg and body power.

In the customary bicycle motion transmission, it is observed that when the rider of the bicycle has his foot on one side at the exact top of the stroke, and his foot on the other side at the exact bottom of the stroke, that most of his force is not actually utilized and there is only a small portion at which he is essentially tangent to the driving sprocket and exerting maximum force.

The rider is dependent upon only a small portion of his total circular motion of each foot to give him any degree of power in his movement.

On the other hand, it has been found that the conventional rotary type motion is effecient and non-tiring for a great deal of the application. On the other hand, the advantage of direct reciprocating strokes wherein essentially tangential force is utilized is recognized. For example, in climbing a steep hill, control is much better with the tangentail type action in view of the ability to place maximum force on the tangent of the driving mechanism.

There have been efforts to develop systems by which the direct downward force of the foot could be used, such as the development of U.S. Pat. No. 3,661,404, heretofore referred to. All such efforts with levers, and the like, have been less than satisfactory, since they have always required an excessive amount of mechanism, such as is illustrated in the aforementioned U.S. Pat. No. 3,661,404. Additionally, the action over a long period of time of this type transmission is excessively tiring to many persons.

I have now developed a mechanism for transmission of power to a bicycle in which it may alternately be used for a reciprocating type motion to obtain maximum power, such as for climbing hills and, and the same time, to be easily switched to the conventional rotary type motion to which we are all accustomed.

I have accomplished this great advance in the art of bicycle power transmission by the use of two roller clutches or ratchets, or the like, driving each one by means of one pedal through a portion of a stroke only. Thus maximum power can be achieved quite readily. Additionally, however, by locking the two units together, the two pedals can be placed at 180° from one another so tht the usual rotary motion may take place without difficulty.

Utilizing my invention, a bicycle rider may now take a long uphill ride with the greatest of ease, since all he needs to do is transfer his weight back and forth from one foot to the other, getting full pressure of his weight in the motion up the hill by reason of the reciprocating type power transmission. On the oher hand, when he is on a long, flat, area he may switch to either mode and proceed on that basis.

It is to be understood, while I have talked about a bicycle rider, the same mechanism and application would be appropriate to certain of the small vehicles utilizing three or more wheels in the form of a vehicle suitable to transport more than one person, and have somewhat the appearance of an automotive vehicle. In such cases, this mechanism is also applicable.

It is an object of this invention to provide a means for applying reciprocating pedal motion to propel a bicycle or the like;

Another object of this invention is to provide a means by which either reciprocating pedal motion or customary rotary foot motion may be utilized at the option of the rider.

It is a further object of this invention to provide a means by which reciprocating pedal power can be adapted to any standard type bicycle or pedal powered vehicle, wherein an assembly kit could be provided for the desired application.

The foregoing and other objects and advantages of this invention will be understood by those skilled in the art upon reading the Description of a Preferred Embodiment which follows and by reviewing at the same time the attached drawings.

BRIEF DESCRIPTION OF THE DRAWINGS

FIG. 2 is an exploded view of the mechanism (excepting the shaft) within the hub of the bicycle drive sprocket;

FIG. 3a is an enlarged perspective view of the shaft for the mechanism of FIG. 2;

FIG. 3c is an enlarged perpective showing the mounting detail of the pedal illustrated in FIG. 3b;

DESCRIPTION OF A PREFERRED EMBODIMENT

Figure 1:
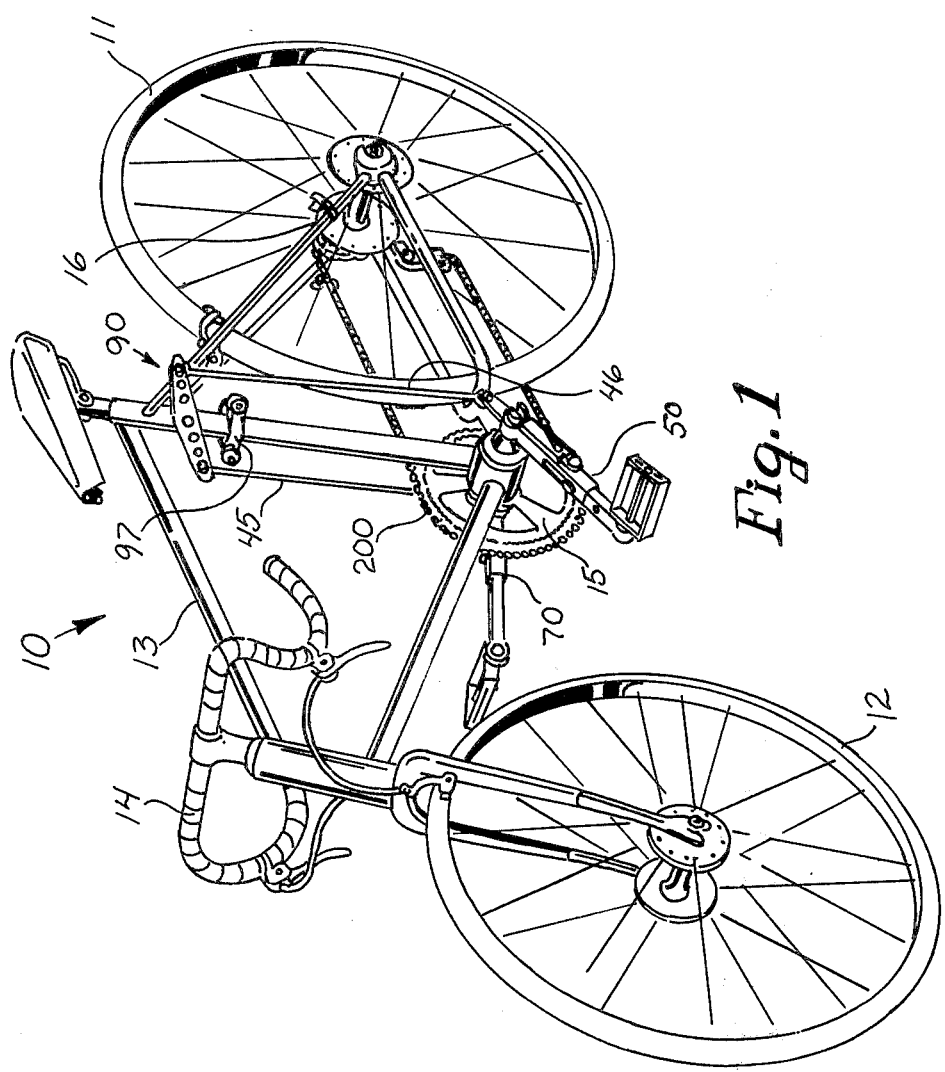
FIG. 1 is a perspective of a complete bicycle embodying this invention.

FIG. 1 is an illustration of what appears to be a conventional bicycle 10 with its standard components such as rear wheel 11, front wheel 12, frame 13, handlebar 14, sprocket 15 and rear sprocket 16. However, upon a closer examination pf FIG. 1 it is seen that various aspects of the bicycle illustrated, such as rocker assembly 90, connecting links 45 and 46, and rocker arm limiter 97, are unconventional, and in fact new and unique to my invention.

For instance, the customary arrangement of pedals and driving sprocket is such that the pedals are directly opposed to one another, that is to say 180° apart in relation to the circumference of the driving sprocket. The driving sprocket is rotated on its axis through a full 360° as it imparts the torque required to drive the chain and rear wheel of the bicycle.

Once again, directing attention towards FIG. 1, it is seen that the pedals 50 and 70 in this illustration are approximately 90° apart from one another. A unique feature of this invention, as will be discussed throughout this embodiment.

The pedals 50 and 70, are affixed to concentric shafts which in turn drive two separate ratchet type one-way clutches, imparting a driving torque to sprocket 15, and chain 200 which in turn drive rear sprocket 16 and rear wheel 11. Details of this arrangement will be described at a later point in the text which follows. The pedals are arranged so that nearly tangential force is applied to sprocket 15, providing efficient driving torque to said sprocket as the pedals are motivated in the reciprocating mode of this embodiment. The pedals are connected to one another though a unique and interesting arragement of connecting rods in such a way that both pedals move in unison, that is to say that as pedal 70 is moving through the arc of its power stroke, pedal 50 is moving through the arc of its return stroke. This reciprocating action is also represented schematically in one of the illustrations which follow.

This unique invention also offers the user the added advantage of selecting either the reciprocating mode of operation (as will be discussed in even greater detail further on in this description of a preferred embodiment) or the conventional full crank rotation.

FIG. 2 is an illustration of an exploded view of the actual driving mechanism of the invention. Hub 21 is of standard configuration as would be familiar to one skilled in the art, and provides a housing for roller bearings 22 and 23. The bearings are suitably held in place at opposite ends of hub 21. Driving sprocket 15 is of customary configuration and is provided with holes 44 therethrough. Driving of sprocket 15 is accomplished though the application of two one-way ratchet type clutches 33 and 36, mounted on opposite sides of sprocket 15, and secured in place aligning clutch mounting holes 35 and 43 with sprocket holes 44, after which rivits 36c are inserted therethrough and rivited firmly in place. At this time, more attention should be given to the aforementioned one-way ratchet type clutches. In the view taken in FIG. 2, clutch 33 and 36 would be so designated as to be in driving engagement during clock-wise rotation of discs 33b and 36b and free-spinning when clutch discs 33b and 36b are rotated in a counter clockwise direction. Crankshaft 26 is inserted through concentrically aligned bearings 23 and 22 of hub 21, and is secured to clutch 33 by aligning the keyways 27 and 34a, and locking said keyways in this position with key 24. FIG. 3a is an illustration of crankshaft 39. The illustration clearly shows that shaft 39 has been machined to form a head 39a thereon. The tapered slot 39b has been machined into head 39a as shown. Shaft 39 has also been provided with keyway 39d and a notch 39c formed thereon.

Figure 3B:
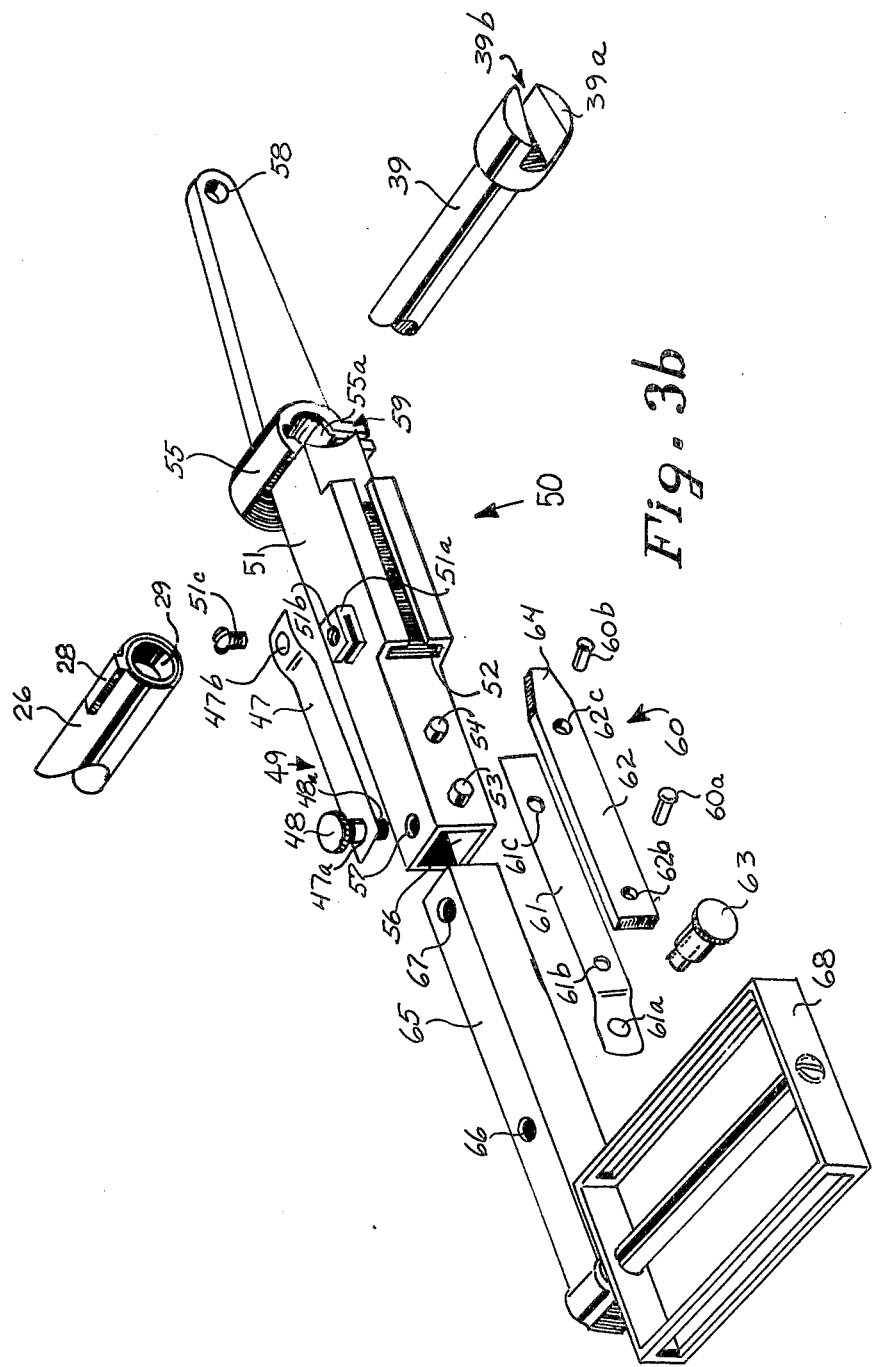
FIG. 3b is an exploded view of one pedal assembly of my invention.

FIG. 3b illustrates a detailed exploded view of pedal assembly 50. Careful examination of this figure shows an interesting and unique assemblage of parts. Pedal arm 51 could be cast out of any suitable material as would be familiar to the skilled artisan. The cast arm would be machined in such a way that keyway 52 would be formed therein. The casting process would permit the formation of studs 53 and 54, collar 55 (with subsequent machines bore 55a) and partially hollow bore 56. Further machining would provide arm 51 with holes 57 and 58, and a retensive area 59.

FIGS. 3b and 3c illustrate the means whereby pedal assembly 50 is mounted upon shaft 26. Shaft 26, as previously described, passes through bearings 22 and 23 of hub 21, and is fixed at one end to clutch assembly 36. (Refer to FIG. 2). The other end with key 28, is now inserted through bore 55a of collar 55, making sure that key 28 is in alignment with keyway 55b. Bolts 75 is now inserted through hole 75a of both flanges 55c and 55d, and is fixed in position with nut 75b.

FIG. 3b particularly illustrates key assembly 60, which is formed by riveting leaf spring 61 to form key 62 with rivets 60a and 60b, said formed key having a tapered end 64. Leaf spring 61 has been formed in such a way, that one of its ends has been curved and tempered as illustrated. Said curved end has been provided with hole 61a therethough. A knurled knob 63 is provided with a partial bore identical to 61a. Knob 63, its bore in alignment with hole 61a, is now fixed to spring 61 in a suitable manner, as would be familiar to the skilled artisan. Shaft 39 as shwon in both FIGS. 3a and 3b can now be inserted though the hollow bore 55a of collar 55 and further through the bearings and hollow bores of shaft 26. The shaft should be inserted until its end emerges from hole 37 of clutch assembly 36. Keyway 39d should be aligned with keyway 37a of clutch 36, and locked in said alignment by the insertion of key 77 (FIG. 2). Details of the assembly whereby pedal assembly 70 will be mounted upon shaft 39 will be discussed in later text.

Tapered end 64 af assembly 60 is now inserted through open keyway 52 which is slightly forward of stud 54. Assembly 60 is slid forward through keyway 52 until the curved spring end of assembly 60 makes contact with the vertical surface of arm 51, from which studs 53 and 54 protrude. At this point key 60 will be moved still farther forward until the bore of knob 63 has been aligned with stud 53, and seats thereon. In this mode, arm 51 may be rotated about its axis in cooperation with shaft 26 and clutch assembly 33, but independent of shaft 39. This particular configuration illustrates the reciprocating mode of my invention. By lifting the knob 63 of key 60 until it disengages with stud 53, and by sliding said key forward through the keyway 52 until tapered end 64 engages with tapered slot 39b, shafts 26 and 39 can be locked to one another. Additionally, with tapered end of key 60 in this position the bore of knob 63 should be seated upon stud 54. In this configuration, the user is in the conventional full crank mode of operation.

FIG. 3b also illustrates extension arm 65, to which pedal 68 has been attached. Arm 65 has been formed in a way that its section is compatable with bore 56 of arm 51, and is slightly smaller so that it can be inserted securely, yet movable within bore 56, said bore acting as a sleeve. Arm 65 is provided with holes 66 and 67 of identical size. These holes would be spaced in an attitude similar to that shown in FIG. 3b. That is to say, one nearer the pedal end of arm 65, and one nearer the opposite end of said arm. A locking assembly 49 has been provided for arm extension 65. This assembly consists of a leaf spring 47, and knurled knob 48. The spring 47 is provided with a hole 47a therethrough, through which the step-down end 48a of knob 48 is inserted. Knob 48 is fixed to spring 47 such as by cold heading, welding, or other suitable means as would be familiar to the skilled artisan. It should be noted that the step-down end 48a of knob 48 will be of a length greater than the combined wall thickness of arm 51 and extension 65. Spring lock 49 is now fixed to arm 51, by aligning hole 47b in spring 47 with hole 51b in formed tab 51a, and by inserting a suitable fastener such as screw 51c therethrough. Arm 65 is then inserted into formed sleeve 56 until either hole 67 or 66 aligns with hole 57. At the same time, knob 48 is lifted so as to disengage it with hole 57. Knob 48 is now released, and end 48a of knob 48 is held in place, having protruded through the aligned holes.

This unique assemblage allows for increased leverage to crank shaft 26 and 39 when operating in the reciprocating mode, although the user may choose to use the normal pedal arrangement in which extension hole 66 is aligned with hole 57 of arm 51, and securely held in this position by spring lock 49. Non-extended pedal must be utilized in the full crank mode of operation in order to maintain proper ground clearance.

Figure 4:
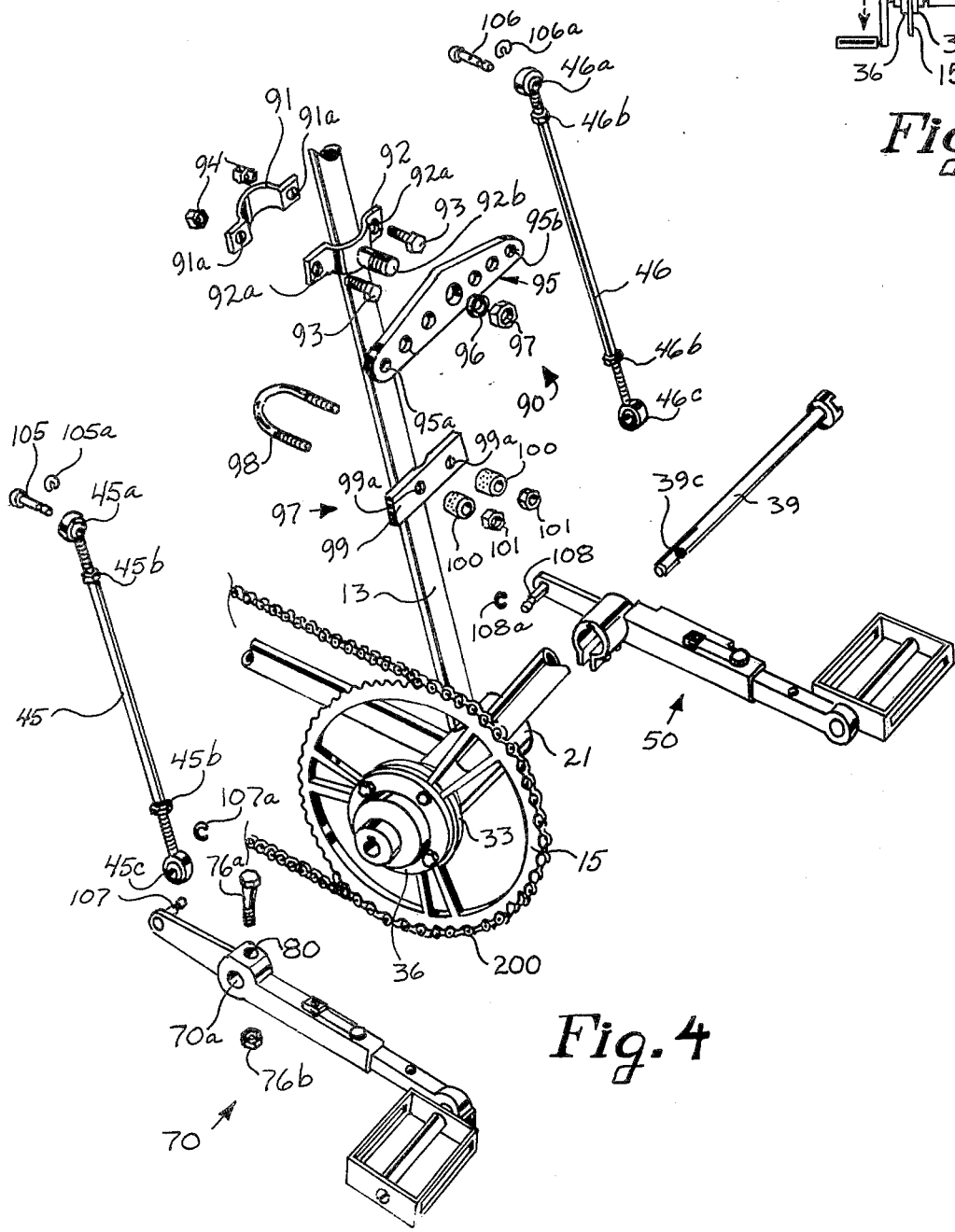
FIG. 4 is an exploded view illustrating the reciprocating transfer motion mechanism; and, FIG. 5 is a schematic view illustrating the reciprocating motion and rocker arm.

The illustration of FIG. 4 shows an exploded view of the linkage which is unique to the reciprocating mode of my invention. Attention should first be directed towards pedal assembly 70 which is the final component of my main sprocket driving mechanism. Assembly 70 is similar with respect to the extension capability of pedal 50, and is also provided with bore 80 therethrough. By aligning bore 70a of assembly 70 with shaft 39, pedal assembly can now be positioned on shaft 39 which has been provided with machined groove 39c therein so that groove 39c and hole 80 are now in alignment. Tapered bolt 76a is now forcibly inserted through aligned passages 39c and hole 80, and is secured in place with nut 76b. This procedure is well known to those skilled in the art, and is regarded as preferred method.

It should be noted that in this assembly, the tapered slot 39b tapers towards the pedal end of pedal assembly 70. This is important, in that pedal assemblies 50 and 70 must be directly opposed (180° apart) to one another in the conventional full crank mode. This is accomplished when either pedal assembly 50 or 70 is rotated until the tapered slot 39b and the tapered end 64 of lock 60 are in alignment with one another, so that lock 60 may engage with the aforementioned slot, thereby locking both crankshafts together in the full cranking mode. Pedal assembly 50 will mount upon the crankshaft 26 (not visible in FIG. 4).

A two piece bracket is formed by bracket halves 91 and 92, said bracket halves positioned on frame member 13, and adjustable in a vertical attitude thereon. Bracket halves 91 and 92 are secured together by the insertion of bolts 93 through bracket holes 92a and 91a. The bolts are then held in place with hex nuts 94. Bracket 92 has been formed with threaded stud 92b thereon. Rocker arm 95 with self-centering bearing 96 is now mounted upon stud 92b and movable thereon. A locknut 96a is employed in order that rocker 95 is held in the desired position on stud 92b. Located directly beneath rocker assembly 90 on frame member 13 is bracket assembly 97 which limits the rocker arm to a designated amount of travel. This will be understood in further explanation, but this bracket which acts as a stop consists of u-bolt 98, mounting plate 99 with a channel formed on one side of said plate to accept frame member 13, two rubber stops 100, and two retaining nuts 101. U-bolt 98 is positioned on frame member 13, so that its threaded ends face towards the front of the bicycle. Plate 99 is positioned so that its formed channel may engage frame member 13 and with holes 99a and threaded u-bolt ends in alignment. The u-bolt ends are then inserted through aligned holes 99a, so that they protrude therethrough. Rubber stops 100 are now positioned on the protruding ends of u-bolt 98, and are secured in place with hex nuts 101. The bottom edge of rocker 95 should be in alignment with rubber stops 100.

The illustration of FIG. 4 also shows linkage 45 and 46. Connectng links 45 and 46 are of sufficient interest, for they control the reciprocating action between pedal assemblies 70 and 50. Link 45 is provided with adjustable rod end bearings 45a and 45c, which are locked in position with respect to link 45 by lock nuts 45b. In a like manner, link 46 is provided with identical rod end bearings 46a and 46c and is likewise adjustable with lock nuts 46b. Rod end bearings 45a and 46a are provided with threaded ends, which cooperate with threaded sleeve portions of links 45 and 46. By turning rod end bearings 45a and 46a in their respective sleeves, and locking them at the desired point with lock nuts provided, an overall increase or decrease in length of links 45 and 46 may be obtained, and allows for adjustment in pedal position. This relationship will be shown more clearly in FIG. 5. Connecting links 45 and 46 are now connected to rocker 95 in the following manner:

1. Bracket assembly 97 is positioned as desired on frame member 13. As the relative position of bracket 97 limits the travel of racket 95, this in effect alters the reciprocation (length of stroke) of the pedals. (Also see FIG. 5.)

2. Rod end bearings 45a and 46a are positioned so as to have their centers in alignment with mounting holes 95a and 95b in rocker 95.

3. The rod end bearings are then attached to said rocker arm mounting holes by pins 105 and 106 and their corresponding snap rings. Rod end bearings 45c and 46c of connecting links 45 and 46, are then connected to pedal assemblies 50 and 70, so that bearing 45c of connecting link 45 is positioned upon pin 107 of assembly 70, secured thereon by snap ring 107a, and bearing 46c of connecting link 46 is aligned and positioned upon pin 108 of assembly 50, and locked in place thereon by snap ring 108a.

Figure 5:
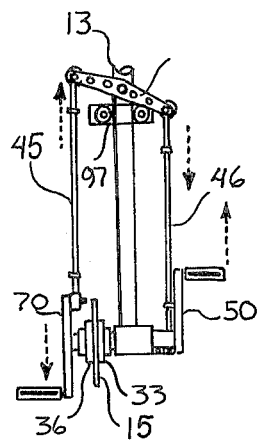

This reciprocal linkage arragement is better seen in FIG. 5. As pedal 70 is pumped downwards in the arc of its power stroke, it pushes link 45 upwards, moving rocker 95 in a clockwise direction, until such motion is terminated by an interference with stop assemby 97. During this particular procedure, and due to the reciprocal arrangement of links 45 and 46 as well as rocker 95, link 46 was forced in a donward direction, with a corresponding effect of having pedal 50 pushed upwardly in a return stroke. At this point the procedure would be reversed and in such a manner, driving force would be imparted to clutches 33 and 36, further driving sprocket 15. This description of course, details the reciprocating mode of the invention. By merely disconnecting links 45 and 46 from their respetive pedal assemblies at rod end bearings 45c and 46c, fastening the now dangling links 45 and 46 to spring restraint clips 125 and 126 (shown in FIG. 1), and by locking pedal assembly 50 to shaft 39 (as was mentioned in the earlier text) and after having rotated assembly 50 by 180°, the conventional full cranking mode of this invention may be utilized. Although the aforementioned text clearly applies to a conventional bicycle, and is so definitive as to properly describe the whole of the embodiment of this invention as it applies to a bicycle, in no way is it means to limit the full scope and effective applications of this invention.

While the embodiment of this invention shown and described is fully capable of achieving the objects and advantages desired, it is to be understood that this has been for purposes of illustration only and not for purposes of limitation.

I claim:

1. A drive mechanism comprising a sprocket suitable to drive a chain; a first torque imparting means attached to one side of said sprocket having the characteristics of imparting torque to said sprocket when rotated in one direction and being free spinning and imparting no torque to said sprocket when rotated in the reverse direction; a second torque imparting means attached to the other side of said sprocket and having the same characteristics of said first torque imparting means so as to impart torque to said sprocket in a like manner and in the same direction; a first hollow shaft attached to said first torque imparting means; a second shaft attached to said second torque imparting means, being concentrically positioned within said first hollow shaft and rotatable therein, the operation of said shafts being independent, a slot means provided in said second shaft; a first force arm adjustably connected to said first hollow shaft and containing insertion means which could be inserted into said slot means on said second shaft; a second force arm adjustably connected to said second shaft, the reciprocal movement of the force arms causing the motion of the said sprocket when said shafts are operating independently of one another; rotary movement of the force arms causing the motion of said sprocket if said first force arm is repositioned on said first hollow shaft so that said insertion means on said first force arm can be inserted into said means in said second shaft so as to lock the shafts together so as to operate in a dependent manner; a rocker arm with a self-centering bearing pivotally mounted on a horizontal stud, which stud is mounted on a vertical frame member; a first connecting link removably connected at one end to said first force arm and at its other end to a first end of said pivotally mounted rocker arm when said shafts are operating independently, being disconnected when said shafts are operating dependently; a second connecting link removably connected at one end to said second force arm and at its other end to a second end of said pivotally mounted rocker arm when said shafts are operating independently, being disconnected when said shafts are operating dependently and a rocker arm limiter is located beneath said rocker arm and is vertically adjustable with respect to said rocker arm, so that the rocking travel of said rocker arm; and the resultant stroke of said force arms is variable according to the vertical clearance between said rocker arm and said rocker arm limiter.

* * * * *